(12) United States Patent
Kihara et al.

(10) Patent No.: US 7,700,237 B2
(45) Date of Patent: *Apr. 20, 2010

(54) HYDROGEN STORAGE ALLOY AND ALKALINE SECONDARY BATTERY USING THE SAME

(75) Inventors: Masaru Kihara, Takasaki (JP); Takahiro Endo, Takasaki (JP); Tatsuya Aizawa, Takasaki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 106 days.

This patent is subject to a terminal disclaimer.

(21) Appl. No.: 11/640,504

(22) Filed: Dec. 18, 2006

(65) Prior Publication Data
US 2007/0158001 A1      Jul. 12, 2007

(30) Foreign Application Priority Data
Dec. 22, 2005   (JP)   ............................. 2005-369766

(51) Int. Cl.
*H01M 4/58* (2006.01)
*H01M 10/32* (2006.01)

(52) U.S. Cl. ................. 429/218.2; 429/223; 429/231.6; 420/900

(58) Field of Classification Search .............. 429/218.2, 429/223, 231.6; 420/900
See application file for complete search history.

(56) References Cited

U.S. PATENT DOCUMENTS 4,126,242 A * 11/1978 Yajima et al. ............... 220/660
6,200,705 B1 * 3/2001 Hayashida et al. ....... 429/218.2

FOREIGN PATENT DOCUMENTS

JP     2005-290473 A     10/2005

* cited by examiner

*Primary Examiner*—Patrick Ryan
*Assistant Examiner*—Muhammad Siddiquee
(74) *Attorney, Agent, or Firm*—Westerman, Hattori, Daniels & Adrian, LLP

(57) ABSTRACT

The composition of hydrogen storage alloy particles used in a negative plate of an alkaline secondary battery is expressed by a general formula: $(La_a Pr_b Nd_c Z_d)_{1-w} Mg_w Ni_{z-x-y} Al_x T_y$. In the formula, Z is an element selected from the group consisting of Ce and others, and T is an element selected from the group consisting of V and others. Subscripts a, b, c and d fall in ranges of $0 \leq a \leq 0.25$, $0 < b$, $0 < c$, and $0 \leq d \leq 0.20$, respectively, and satisfy the relationship expressed by $a+b+c+d=1$, where $0.20 \leq b/c \leq 0.35$. Subscripts x, y, z and w fall in ranges of $0.15 \leq x \leq 0.30$, $0 \leq y \leq 0.5$, $3.3 \leq z \leq 3.8$, and $0.05 \leq w \leq 0.15$, respectively.

16 Claims, 2 Drawing Sheets

HYDROGEN STORAGE ALLOY AND ALKALINE SECONDARY BATTERY USING THE SAME

BACKGROUND OF THE INVENTION

1. Field of the Invention

The present invention relates to a hydrogen storage alloy and an alkaline secondary battery using the same.

2. Description of the Related Art

A hydrogen storage alloy is capable of storing hydrogen safely and easily and therefore gains public attention as an energy conversion material and an energy storage material.

As one application example, a nickel-hydrogen secondary battery using a hydrogen storage alloy for its negative electrode is in great demand as a consumer battery for its property such as high capacity and cleanliness. A negative electrode using a hydrogen storage alloy consisting of a rare earth-Mg-based alloy has recently been developed with a view to actualizing a higher capacity of the nickel-hydrogen secondary battery.

The rare earth-Mg-based alloy is alloy obtained by substituting Mg for a portion of a rare earth element of a conventional $AB_5$-type rare earth-based alloy. Compared to the $AB_5$-type rare earth-based alloy, the rare earth-Mg-based alloy is characterized by a capability to store a great quantity of hydrogen gas at around ambient temperature.

On the other hand, the rare earth-Mg-based alloy has the disadvantage of low corrosion resistance against alkaline electrolyte. As a consequence, the secondary battery using the rare earth-Mg-based alloy for its negative electrode also has the disadvantage of a short cycle life.

Japanese Patent Application Publication NO. 2005-290473 discloses that the reason of the low corrosion resistance of the rare earth-Mg-based alloy is that magnesium easily reacts with alkaline electrolyte and creates hydroxides. The publication also explains that if the percentage of La and Ce in the rare earth-Mg-based alloy is set equal to or less than prescribed percentage, this prevents the generation of hydroxides, namely corrosion reaction, and elongates the life duration of the secondary battery.

The rare earth-Mg-based alloy disclosed in the above publication is surely enhanced in alkali resistance. However, the alkaline secondary battery employing this alloy is liable to be increased in battery internal pressure when it is charged after being overdischarged, for example, after it has been used for a long term as a power source of a low-power appliance, such as a remote controller, a clock, and a flashlight. Such increase of internal pressure is not desirable for the cycle life of the battery.

SUMMARY OF THE INVENTION

It is an object of the present invention to provide a hydrogen storage alloy that has alkali resistance, and if used for a negative electrode of an alkaline secondary battery, the battery is suppressed from being increased in internal pressure when charged after being overdischarged, and therefore contributes to improvement of a cycle life of the battery, and an alkaline secondary battery using the alloy.

In order to achieve the above object, the hydrogen storage alloy of the present invention has composition expressed by a general formula:

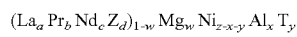

$(La_a Pr_b Nd_c Z_d)_{1-w} Mg_w Ni_{z-x-y} Al_x T_y,$ where Z is at least one element selected from the group consisting of Ce, Pm, Sm, Eu, Gd, Tb, Dy, Ho, Er, Tm, Yb, Lu, Ca, Sr, Sc, Y, Yb, Ti, Zr and Hf. T is at least one element selected from the group consisting of V, Nb, Ta, Cr, Mo, Mn, Fe, Co, Ga, Zn, Sn, In, Cu, Si, P and B. Subscripts a, b, c and d fall in ranges of $0 \leq a \leq 0.25$, $0 < b$, $0 < c$, and $0 \leq d \leq 0.20$, respectively, and satisfy relationship expressed by $a+b+c+d=1$, where $0.20 \leq b/c \leq 0.35$. Subscripts x, y, z and w fall in ranges of $0.15 \leq x \leq 0.30$, $0 \leq y \leq 0.5$, $3.3 \leq z \leq 3.8$, and $0.05 \leq w \leq 0.15$, respectively.

In the hydrogen storage alloy of the present invention, the percentage of La in the A-sites is limited by setting an upper limit of the subscript a indicating an atomic number ratio of La to 0.25. This suppresses a corrosion reaction in which magnesium contained in the hydrogen storage alloy reacts with alkaline electrolyte and creates hydroxides, thereby securing the alkali resistance of the hydrogen storage alloy. Since an atomic number ratio of Pr to that of Nd (Pr/Nd ratio), that is, b/c, falls in the range of from 0.20 to 0.35 inclusively, the alkali resistance is further enhanced, while hydrogen equilibrium pressure is reduced.

Preferably, a main material of Pr and Nd contained in the hydrogen storage alloy is didymium. The preferable hydrogen storage alloy is low in price since the main material of Pr and Nd is didymium, and therefore the material can be prepared without difficulty.

Preferably, the hydrogen storage alloy contains either one or both of Mn and Zn as element denoted by T. In the preferable hydrogen storage alloy, the hydrogen equilibrium pressure is further reduced since either one or both of Mn and Zn is contained.

In order to accomplish the above-mentioned object, the alkaline secondary battery of the present invention has a negative electrode including the hydrogen storage alloy of the present invention.

In the alkaline secondary battery of the present invention, the subscript of La, namely a, is equal to or less than 0.25, and at the same time the Pr/Nd ratio is equal to or less than 0.35. For that reason, the hydrogen storage alloy has great alkali resistance, and when the battery is charged after being overdischarged, excess alkaline electrolyte is held in a separator. As a result, gas permeability of the separator decreases, and the battery internal pressure is prone to increase.

In this alkaline secondary battery, since the Pr/Nd ratio is in a range under 0.35 inclusively, the hydrogen equilibrium pressure of the hydrogen storage alloy is reduced. Moreover, since the Pr/Nd ratio is in a range above 0.20 inclusively, the gas permeability of the separator is maintained at the minimum necessary. Consequently, when the battery is charged after being overdischarged, hydrogen partial pressure is suppressed from being raised in spite of the reduction of the gas permeability of the separator. As a result, the increase of the battery internal pressure is suppressed at the time of charge after overdischarge, which elongates the cycle life of the battery.

To state differently, in this alkaline secondary battery, in order to achieve the object of suppressing the increase of the battery internal pressure when the battery is charged after being overdischarged, the hydrogen equilibrium pressure is reduced in spite that this causes a decrease in the gas permeability of the separator, which contradicts the object. If the Pr/Nd ratio is in the range of from 0.20 to 0.35 inclusively, oxygen partial pressure is increased when the battery is charged after being overdischarged. However, a decreased amount of the hydrogen partial pressure largely surpasses an increased amount of the oxygen partial pressure, and thus the battery internal pressure is reduced.

When the Pr/Nd ratio is higher than 0.35, the hydrogen equilibrium pressure of the hydrogen storage alloy is high, so that the decreased amount of the hydrogen partial pressure is small, so that the battery internal pressure is raised at the time of charge after overdischarge. In contrast, when the Pr/Nd ratio is lower than 0.20, the gas permeability of the separator becomes too low. As a result, the battery internal pressure is increased.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
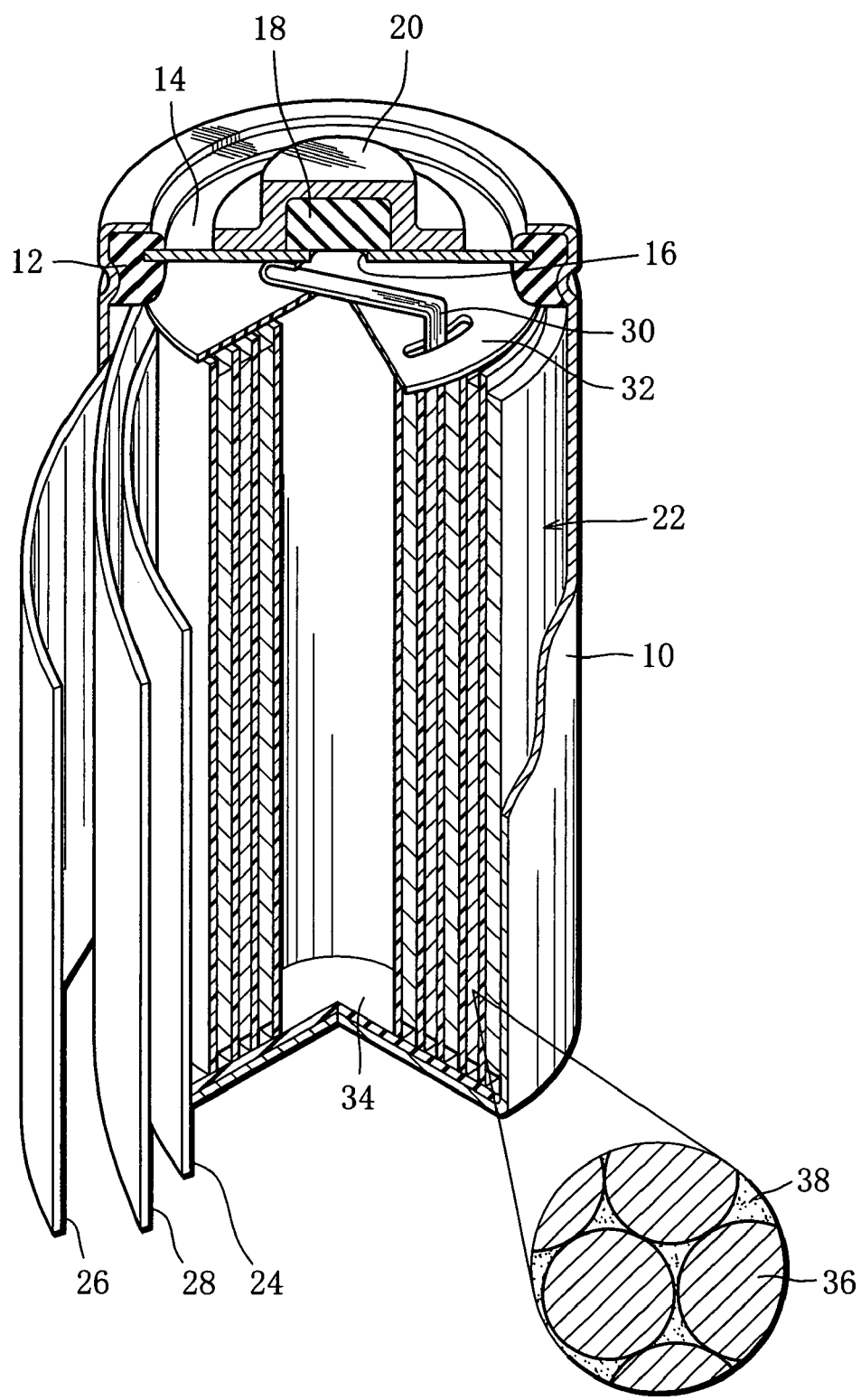
FIG. 1 is a perspective view showing one example of a nickel-hydrogen secondary battery of one embodiment, partially broken away, and schematically illustrates in a circle a part of a negative plate in an enlarged scale.

The inventors repeated various studies for the purpose of achieving the above-mentioned object, and found that if a rare earth-Mg-based alloy is enhanced in alkali resistance, a battery is increased in internal pressure when charged after being overdischarged, and a cycle life of an alkaline secondary battery is reduced according to an aspect described below.

In general, when a nickel-hydrogen secondary battery employing a rare earth-Mg-based alloy in a negative plate is used, battery discharge is finished at around 0.8 V to 1.1 V as final voltage. At this final voltage, average valence of nickel is substantially 2.2 in an active material of a positive plate. In other words, trivalent nickel oxyhydroxide and bivalent nickel hydroxide are mixed at a ratio of 2:8. If the battery continues to be further discharged below the final voltage, the active material is brought close to a state of containing only the bivalent nickel hydroxide.

Nickel oxyhydroxide has a greater crystal lattice than nickel hydroxide. Alkaline electrolyte is taken into the crystal lattice of the nickel oxyhydroxide as water of crystallization (crystal water). This crystal water is released from the crystal lattice as the nickel oxyhydroxide is converted into nickel hydroxide during battery discharge. Accordingly, if more nickel oxyhydroxide than usual is converted into nickel hydroxide due to overdischarge, the alkaline electrolyte contained in the positive electrode as crystal water is excessively released therefrom.

Even if the crystal water is released from a positive active material, as long as the alkali resistance of the rare earth-Mg-based alloy is low, excess alkaline electrolyte is consumed as the alkaline electrolyte and the Mg contained in the alloy produce hydroxides. However, if the rare earth-Mg-based alloy has high alkali resistance, the excess alkaline electrolyte released from the positive plate is not consumed in the negative electrode, so that the excess alkaline electrolyte is held in the separator located in between the positive plate and the negative plate. Therefore, if the battery is overdischarged, gas permeability of the separator decreases.

If the battery is charged while the gas permeability of the separator is decreased as described, hydrogen that is released from the negative plate cannot pass through the separator.

Moreover, when the crystal water is released from the positive active material, and almost all of the active material is turned into nickel hydroxide, the active material is reduced in conductivity. If the battery is charged while the conductivity of the active material is reduced, the active material is raised in temperature due to high resistance. The temperature rise reduces oxygen overvoltage, so that oxygen is likely to generate in the positive plate. The oxygen produced in the positive plate cannot pass through the separator, either. With intent to shorten the charging time, chargers that charge batteries at high current have recently been increased. This, too, is a factor that the above phenomenon is liable to take place.

For that reason, hydrogen partial pressure and oxygen partial pressure in the battery are both increased, which also raises the internal pressure of the battery. If the internal pressure is increased over a prescribed value, a safety valve of the battery is activated. At this moment, not only gas but the alkaline electrolyte in the battery is released outside. If the release of the alkaline electrolyte is repeated too many times, the alkaline electrolyte runs short, and the cycle life of the battery is reduced.

Given this factor, the inventors further studied to suppress the increase of the internal pressure of the alkaline secondary battery according to the above aspect. As a result, the inventors gained the knowledge that the battery internal pressure can be suppressed from being increased during battery charge carried out after overdischarge by reducing hydrogen equilibrium pressure of the rare earth-Mg-based alloy even if the alkali resistance of the alloy is upgraded and the oxygen partial pressure is further increased along with the reduction of the hydrogen equilibrium pressure. Based upon this knowledge, the inventors conceived the present invention.

Hereinafter, a nickel-hydrogen secondary battery will be described below in detail as an alkaline secondary battery according to one embodiment of the present invention.

This battery is a circular cylindrical battery of AA size. As illustrated in FIG. 1, the battery has an outer can 10 in a shape of a circular cylinder with a bottom, whose upper end is open. A bottom wall of the outer can 10 functions as a negative electrode terminal having conductivity. A circular disc-like cover plate 14 having conductivity is placed in the inside of an opening of the outer can 10 with a ring-shaped insulative packing 12 interposed therebetween. The cover plate 14 and the insulative packing 12 are fixed to an opening edge of the outer can 10 by caulking the opening edge.

The cover plate 14 has a gas vent hole 16 in the center. A rubber valve element 18 is placed on an outer surface of the cover plate 14 so as to occlude the gas vent hole 16. A positive electrode terminal 20 in a shape of a circular cylinder with a flange covering the valve element 18 is fixed onto the outer surface of the cover plate 14, too. The positive electrode terminal 20 presses the valve element 18 against the cover plate 14. Accordingly, the outer can 10 is usually closed airtight by the cover plate 14 through the insulative packing 12 and the valve element 18. If gas is produced in the outer can 10, and the internal pressure thereof is increased, the valve element 18 is compressed, and gas is released from the outer can 10 through the gas vent hole 16. In short, the cover plate 14, the valve element 18 and the positive electrode terminal 20 form a safety valve.

An electrode assembly 22 is accommodated in the outer can 10. The electrode assembly 22 includes a positive plate 24, a negative plate 26, and a separator 28 which each have a band-like shape. The separator 28 is sandwiched between the positive plate 24 and the negative plate 26 which are rolled into a spiral shape. In other words, the positive plate 24 and the negative plate 26 are overlapping each other with the separator 28 sandwiched therebetween. An outermost circumference of the electrode assembly 22 is formed of a portion (outermost circumferential portion) of the negative plate 26. The outermost circumferential portion of the negative electrode 26 comes into contact with an inner circumferential wall of the outer can 10, whereby the negative plate 26 and the outer can 10 are electrically connected to each other. The positive plate 24, the negative plate 26 and the separator 28 will be described later.

In the outer can 10, a positive lead 30 is disposed in between one end of the electrode assembly 22 and the cover plate 14. Both ends of the positive lead 30 are connected to the positive plate 24 and the cover plate 14. Accordingly, the positive electrode terminal 20 and the positive plate 24 are electrically connected to each other through the positive lead 30 and the cover plate 14. A circular insulative member 32 is placed in between the cover plate 14 and the electrode assembly 22. The positive lead 30 extends through a slit formed in the insulative member 32. A circular insulative member 34 is located in between the electrode assembly 22 and a bottom portion of the outer can 10.

A prescribed amount of alkaline electrolyte, not shown, is poured into the outer can 10. By the medium of the alkaline electrolyte included in the separator 28, a charge-discharge reaction proceeds between the positive plate 24 and the negative plate 26. The alkaline electrolyte is not limited to any particular kind. For example, a sodium hydroxide solution, a lithium hydroxide solution, a potassium hydroxide solution, a solution obtained by mixing two or more of these solutions or the like may be used. The alkaline electrolyte is also not particularly limited in terms of concentration. However, considering a balance between the gas permeability and various battery properties, desirable concentration of the electrolyte is in a range of from 10N to 7N. A desirable amount of the electrolyte depends upon battery size. It is still preferable that a proportion of the electrolyte to battery capacity be within a range of from 1.00 ml/Ah to 0.50 ml/Ah.

As material for the separator 28, for example, polyamide fiber nonwoven fabric or polyolefin fiber nonwoven fabric, such as polyethylene and polypropylene, which is provided with a hydrophilic functional group may be used. The separator is not particularly limited in terms of fiber areal weight. In view of a balance between the gas permeability and capability of short-circuit resistance, however, it is preferable that the fiber areal weight be in a range of from 65 g/m² to 30 g/m².

The positive plate 24 is made up of a conductive positive substrate having a porous structure and a positive mixture that is held in holes of the positive substrate. The positive mixture includes positive active material particles, particles of various additives for improving properties of the positive plate 24 as appropriate, and bond for fixing mixed particles of the positive active material particles and the particles of additives onto the positive substrate.

The positive active material particles are nickel oxide particles in a broad sense since the battery is a nickel-hydrogen secondary battery. When the battery is in a charged state, nickel oxyhydroxide is the major component of the nickel oxide, whereas when the battery is in a discharged state, nickel hydroxide is the major component of the nickel oxide.

The nickel oxide particles (nickel hydroxide particles) may be a solid solution containing a small amount of cobalt, zinc, cadmium, etc., or may be covered in a surface with a cobalt compound which has been subjected to alkali-heat treatment. The additives and the bond are not limited to any particular kinds. As the additives, other than yttrium oxide, a cobalt compound, such as cobalt oxide, metallic cobalt and cobalt hydroxide, a zinc compound, such as metallic zinc, zinc oxide and zinc hydroxide, a rare earth compound such as erbium oxide or the like may be used. As the bond, hydrophilic or hydrophobic polymer or the like may be used.

The negative plate 26 has a conductive negative substrate formed in a band-like shape. A negative mixture is held by the negative substrate. The negative substrate is made up of a sheet-like metal material in which through-holes are distributed. For example, a metal powder sintered substrate that is obtained by molding and then sintering metal powder may be used. Therefore, the negative mixture is filled into the through-holes of the negative substrate and is simultaneously maintained on both sides of the negative substrate in the form of layers.

As schematically shown in a circle in FIG. 1, the negative mixture contains hydrogen storage alloy particles 36 capable of storing and discharging hydrogen serving as negative active material, a conduction auxiliary agent, not shown, such as carbon, if desired, and bond 38 for fixing the hydrogen storage alloy and the conduction auxiliary agent onto the negative substrate. As the bond 38, hydrophilic or hydrophobic polymer or the like may be used. As the conduction auxiliary agent, carbon black or black lead may be used. If the active material is hydrogen, negative electrode capacity is defined by amount of the hydrogen storage alloy. Therefore, in the present invention, the hydrogen storage alloy is also referred to as negative active material.

The hydrogen storage alloy in the hydrogen storage alloy particles 36 of the battery has a superlattice structure such that an $AB_5$-type structure and an $AB_2$-type structure are merged. This superlattice structure is not an $AB_5$-type structure but an $AB_{3.5}$-type ($Ce_2Ni_7$-type structure).

Composition of this hydrogen storage alloy is expressed by the following general formula:

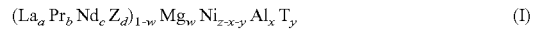

$$(La_a Pr_b Nd_c Z_d)_{1-w} Mg_w Ni_{z-x-y} Al_x T_y \quad (I)$$

where Z is at least one element selected from the group consisting of Ce, Pm, Sm, Eu, Gd, Tb, Dy, Ho, Er, Tm, Yb, Lu, Ca, Sr, Sc, Y, Yb, Ti, Zr and Hf. T is at least one element selected from the group consisting of V, Nb, Ta, Cr, Mo, Mn, Fe, Co, Ga, Zn, Sn, In, Cu, Si, P and B. Subscripts a, b, c, and d fall in ranges expressed by $0 \leq a \leq 0.25$, $0<b$, $0<c$, and $0 \leq d \leq 0.20$, respectively, and satisfy relationship indicated by $a+b+c+d=1$, where $0.20 \leq b/c \leq 0.35$. Subscripts x, y, z and w are in ranges expressed by $0.15 \leq x \leq 0.30$, $0 \leq y \leq 0.5$, $3.3 \leq z \leq 3.8$, and $0.05 \leq w \leq 0.15$, respectively.

The hydrogen storage alloy particles 36 are obtained, for example, in the following manner.

First, metal raw materials are weighed and mixed together so as to have the composition shown by the general formula (I). This mixture is dissolved, for example, by a high-frequency melting furnace and formed into an ingot. The ingot thus obtained is subjected to heat treatment in which the ingot is heated in an inert gas atmosphere at a temperature of 900 to 1200 degrees centigrade for 5 to 24 hours. Metallographic structure of the ingot is made into a superlattice structure such that the $AB_5$-type and $AB_2$-type structures are merged. Subsequently, the ingot is pulverized and sifted into desired particle sizes by sieve classification, to thereby produce the hydrogen storage alloy particles 36.

It is preferable to use didymium as a main metal raw material of Pr and Nd. Since didymium is a mixture of Pr and Nd, it is possible to save the process of separately preparing single metals, such as Pr and Nd. Didymium is less expensive than single metals, such as Pr and Nd, so that the hydrogen storage alloy, and correspondingly the nickel-hydrogen secondary battery, is low in price. In case that didymium is used, either one or both of the single metals, namely Pr and Nd, may be used with didymium to adjust the composition.

The hydrogen storage alloy having the composition shown by the above-mentioned general formula (I) is rare earth-Mg-based alloy in which a portion of the A-sites is substituted with Mg.

In the hydrogen storage alloy, an upper limit of the subscript a indicating an atomic number ratio of La is set to 0.25, which limits the percentage of La in the A-sites. This suppresses a corrosion reaction in which the Mg contained in the hydrogen storage alloy reacts with the alkaline electrolyte to produce hydroxides. Consequently, the alkali resistance of the hydrogen storage alloy is secured. A preferable range of the a is $0 \leq a \leq 0.20$.

In the hydrogen storage alloy, Pr/Nd ratio (b/c) that is the ratio of the atomic number of Pr to that of Nd is equal to or less than 0.35. Therefore, the alkali resistance of the hydrogen storage alloy is further enhanced, and the hydrogen equilibrium pressure is reduced at the same time.

The nickel-hydrogen secondary battery according to the one embodiment employs the hydrogen storage alloy particles 36 consisting of the above-mentioned hydrogen storage alloy in the negative plate 26. As a result, the increase of the battery internal pressure is suppressed during battery charge carried out after overdischarge, which elongates the cycle life. A reason for this will be provided below.

In general, when a nickel-hydrogen secondary battery in which rare earth-Mg-based alloy is employed in a negative plate is used, battery discharge is finished at around 0.8 V to 1.1 V as final voltage. At this final voltage, average valence of nickel is substantially 2.2 in nickel oxide serving as a positive active material. In other words, nickel oxyhydroxide in which an average valence of nickel is 3 and nickel hydroxide in which the average valence of nickel is 2 are mixed at a ratio of 2:8. If the battery continues to be further discharged below the final voltage, the active material is brought close to a state of containing only nickel hydroxide.

Nickel oxyhydroxide has a greater crystal lattice than nickel hydroxide. The alkaline electrolyte is taken as crystal water into the crystal lattice of the nickel oxyhydroxide. The crystal water is released from the crystal lattice as the nickel oxyhydroxide is converted into nickel hydroxide when the battery is discharged. Therefore, if more nickel oxyhydroxide than usual is converted into nickel hydroxide due to overdischarge, the alkaline electrolyte contained in the positive electrode as crystal water is overly released therefrom.

When the crystal water is released from the positive active material, if the alkali resistance of the rare earth-Mg-based alloy is low, the excess alkaline electrolyte is consumed as the alkaline electrolyte and Mg contained in the alloy produce hydroxides. However, if the alkali resistance of the rare earth-Mg-based alloy is high, the excess alkaline electrolyte released from the positive plate is not consumed in the negative electrode, so that the separator located in between the positive and negative plates maintains the excess alkaline electrolyte. Consequently, if the battery is overdischarged, the gas permeability of the separator decreases.

If the battery is charged when the gas permeability of the separator is decreased as described above, the hydrogen released from the negative plate cannot pass through the separator.

Furthermore, if the crystal water is released from the positive active material, and almost all of the active material is turned into nickel hydroxide, the conductivity of the active material lowers. If the battery is charged when the conductivity of the active material is low, the active material is raised in temperature due to high resistance. The temperature rise reduces oxygen overvoltage, so that oxygen is likely to generate in the positive plate. The oxygen produced in the positive plate cannot pass through the separator, either.

For that reason, hydrogen partial pressure and oxygen partial pressure in the battery are both increased, which raises the internal pressure of the battery. If the internal pressure is increased over a prescribed value, the safety valve of the battery is activated. At this moment, not only the gas but the alkaline electrolyte in the battery is released outside. If the release of the alkaline electrolyte is repeated too many times, the alkaline electrolyte runs short, and the cycle life of the battery is shortened.

In contrast, in the nickel-hydrogen secondary battery according to the one embodiment, since the Pr/Nd ratio is 0.35 or less, the hydrogen equilibrium pressure of the hydrogen storage alloy is reduced. At the same time, since the Pr/Nd ratio is 0.20 or more, the gas permeability of the separator 28 is secured at the minimum necessary. Therefore, in this secondary battery, in spite of the reduction of gas permeability of the separator 28, the hydrogen partial pressure is suppressed from being raised during battery charge carried out after overdischarge. In consequence, the increase of the battery internal pressure is suppressed during battery charge carried out after overdischarge, so that the alkaline electrolyte is prevented from being reduced, which elongates the cycle life of the battery.

In other words, the hydrogen equilibrium pressure is reduced in this battery to accomplish the object of suppressing the increase of the battery internal pressure when the battery is charged after being overdischarged, in spite that the reduction of the hydrogen equilibrium pressure is accompanied by the decrease of gas permeability of the separator 28 which contradicts the object. If the Pr/Nd ratio is in the range of from 0.20 to 0.35 inclusively, although the oxygen partial pressure is raised during battery charge carried out after overdischarge, a decreased amount of the hydrogen partial pressure greatly surpasses an increased amount of the oxygen partial pressure, and thus the battery internal pressure is decreased.

If the Pr/Nd ratio is higher than 0.35, since the hydrogen equilibrium pressure of the hydrogen storage alloy is high when the battery is charged after being overdischarged, the decreased amount of the hydrogen partial pressure is small, and the battery internal pressure is raised. In contrast, if the Pr/Nd ratio is less than 0.20, the gas permeability of the separator 28 becomes too low, so that the battery internal pressure is increased. Consequently, preferable Pr/Nd ratio is in a range of from 0.20 to 0.25 inclusively.

The reason that, in the general formula (I), the subscripts a, b, c and d have the relationship shown by $a+b+c+d=1$ is because the elements denoted by La, Pr, Nd and Z occupy the A-sites with Mg. To be short, the subscripts a, b, c and d have the above relationship to satisfy the equation: $(a+b+c+d) \times (1-w) + w = 1$.

In the general formula (I), the reason for the limitation of the numeric range of the subscripts x, y, z and w will be explained below.

The subscript x indicating the atomic number ratio of Al is determined to fall in the range expressed by $0.15 \leq x \leq 0.30$ in order to secure the alkali resistance of the hydrogen storage alloy. A preferable range of the subscript x is $0.17 \leq x \leq 0.23$.

The subscript w indicating the atomic number ratio of Mg in the A-sites is set to be 0.05 or more in order to secure a property primarily given to the rare earth-Mg-based hydrogen storage alloy, that is, a property that a hydrogen storage amount at normal temperatures is high. The reason for setting the subscript w to be 0.15 or less is to secure the alkali resistance. A preferable range of the subscript w is $0.09 \leq w \leq 0.13$.

The subscript y indicating the atomic number ratio of the element shown by T is set in the range expressed by $0 \leq y \leq 0.5$. This is because if the subscript y exceeds 0.5, the hydrogen storage amount of the hydrogen storage alloy is reduced. A preferable range of the subscript y is $0 \leq y \leq 0.3$.

The subscript z indicating a ratio of atomic number of the B-sites to the atomic number of the A-sites is set in the range expressed by $3.3 \leqq z \leqq 3.8$. This is because if the subscript z is too low, hydrogen storage stability in the hydrogen storage alloy is enhanced, and in result, the ability of releasing hydrogen is deteriorated. If the subscript z is too high, a hydrogen storage sites in the hydrogen storage alloy are reduced, and the hydrogen storage ability starts to be deteriorated. A preferable range of the subscript z is $3.3 \leqq z \leqq 3.6$.

EXAMPLES

1. Battery Assembly

Example 1

1) Preparation of the Negative Plate

Metal raw materials were mixed to have composition expressed by a general formula: $(La_{0.25} Pr_{0.15} Nd_{0.55} Sm_{0.05})_{0.85} Mg_{0.15} Ni_{3.5} Al_{0.2}$. A mixture thus obtained was cast into an ingot by means of an induction melting furnace. This ingot was subjected to heat treatment in which the ingot was heated in an argon atmosphere at a temperature of 1000 degrees centigrade for 10 hours to control its metallographic structure, whereby the ingot was formed into a lump of hydrogen storage alloy having the above composition.

The lump of hydrogen storage alloy was mechanically pulverized in an inert gas atmosphere and sifted into alloy particles having particle sizes in a range of from 400 to 200 mesh. Particle size histogram of the alloy particles was measured by means of a laser diffraction/scattering-type particle-size distribution measurement device. In result, average particle size corresponding to 50 percent of weight integration was 30 μm, and maximum particle size was 45 μm.

100 parts by mass of alloy powder mentioned above was added with 0.4 parts by mass of sodium polyacrylate, 0.1 parts by mass of carboxymethylcellulose, and 2.5 parts by mass of polytetrafluoroethylene dispersion liquid (disperse medium: water, solid content 60 mass percent). Thereafter, the mixture was kneaded and made into slurry of a negative mixture.

This slurry was applied onto both entire sides of Ni-coated punching metal made of iron which had a thickness of 60 μm evenly, that is, so that the thickness was uniform. After the slurry was dried, the punching metal was pressed and cut into a negative plate for a nickel-hydrogen secondary battery of AA size.

2) Preparation of the Positive Plate

A mixed water solution of nickel sulfate, zinc sulfate and cobalt sulfate was prepared so that percentages of Zn and Co in metal Ni were 3 percent by mass and 1 percent by mass, respectively. Sodium hydroxide water solution was gradually added to the mixed water solution while continuing to stir. In this process, pH in reaction was maintained in a range of from 13 to 14, to thereby obtain a precipitate of nickel hydroxide particles. The precipitate of nickel hydroxide particles were washed three times with a tenfold amount of purified water, and were subsequently dehydrated and dried.

The nickel hydroxide particles thus obtained were mixed with an HPC dispersion liquid of 40 percent by mass, to thereby produce slurry of a positive mixture. This slurry was filled in a nickel substrate having a porous structure and was then dried. The substrate was extended by being applied with pressure and cut into a positive plate for nickel-hydrogen secondary battery of AA size.

3) Assembly of a Nickel-hydrogen Secondary Battery

The negative and positive plates thus obtained were rolled into a spiral shape with a separator sandwiched therebetween, the separator being made up of polypropylene or nylon non-woven fabric. In this manner, the electrode assembly was formed. This electrode assembly was contained in an outer can. The outer can was filled with potassium hydroxide water solution with a concentration of 30 percent by mass, which contained lithium and sodium, to thereby assemble a nickel-hydrogen secondary battery of AA size, which had a volume energy density of 300 Wh/l.

Example 2

A nickel-hydrogen secondary battery was assembled in the same manner as in Example 1 except that the composition of the hydrogen storage alloy was $(La_{0.25} Pr_{0.11} Nd_{0.55} Sm_{0.09})_{0.85} Mg_{0.15} Ni_{3.5} Al_{0.2}$.

Example 3

A nickel-hydrogen secondary battery was assembled in the same manner as in Example 1 except that the composition of the hydrogen storage alloy was $(La_{0.25} Pr_{0.15} Nd_{0.43} Sm_{0.17})_{0.85} Mg_{0.15} Ni_{3.5} Al_{0.2}$.

Example 4

A nickel-hydrogen secondary battery was assembled in the same manner as in Example 1 except that the composition of the hydrogen storage alloy was $(Pr_{0.20} Nd_{0.75} Sm_{0.05})_{0.85} Mg_{0.15} Ni_{3.5} Al_{0.2}$.

Example 5

A nickel-hydrogen secondary battery was assembled in the same manner as in Example 1 except that the composition of the hydrogen storage alloy was $(Pr_{0.20} Nd_{0.75} Sm_{0.05})_{0.85} Mg_{0.15} Ni_{3.4} Al_{0.2} Mn_{0.1}$.

Example 6

A nickel-hydrogen secondary battery was assembled in the same manner as in Example 1 except that the composition of the hydrogen storage alloy was $(Pr_{0.20} Nd_{0.75} Sm_{0.05})_{0.85} Mg_{0.15} Ni_{3.4} Al_{0.2} Zn_{0.1}$.

Example 7

A nickel-hydrogen secondary battery was assembled in the same manner as in Example 1 except that the composition of the hydrogen storage alloy was $(Pr_{0.20} Nd_{0.75} Sm_{0.05})_{0.85} Mg_{0.15} Ni_{3.3} Al_{0.2} Mn_{0.1} Zn_{0.1}$.

Comparative Example 1

A nickel-hydrogen secondary battery was assembled in the same manner as in Example 1 except that the composition of the hydrogen storage alloy was $(La_{0.25} Pr_{0.35} Nd_{0.35} Sm_{0.05})_{0.85} Mg_{0.15} Ni_{2.5} Al_{0.2}$.

Comparative Example 2

A nickel-hydrogen secondary battery was assembled in the same manner as in Example 1 except that the composition of the hydrogen storage alloy was $(La_{0.25} Pr_{0.24} Nd_{0.48} Sm_{0.03})_{0.85} Mg_{0.15} Ni_{3.5} Al_{0.2}$.

Comparative Example 3

A nickel-hydrogen secondary battery was assembled in the same manner as in Example 1 except that the composition of the hydrogen storage alloy was $(La_{0.25} Pr_{0.20} Nd_{0.50} Sm_{0.05})_{0.85} Mg_{0.15} Ni_{3.5} Al_{0.2}$.

Comparative Example 4

A nickel-hydrogen secondary battery was assembled in the same manner as in Example 1 except that the composition of the hydrogen storage alloy was $(La_{0.25} Pr_{0.10} Nd_{0.55} Sm_{0.10})_{0.85} Mg_{0.15} Ni_{3.5} Al_{0.2}$.

Comparative Example 5

A nickel-hydrogen secondary battery was assembled in the same manner as in Example 1 except that the composition of the hydrogen storage alloy was $(La_{0.30} Pr_{0.11} Nd_{0.55} Sm_{0.04})_{0.85} Mg_{0.15} Ni_{3.5} Al_{0.2}$.

2. Evaluation Test of the Battery

1) Battery Internal Pressure During Battery Charge After Overdischarge

Figure 2:
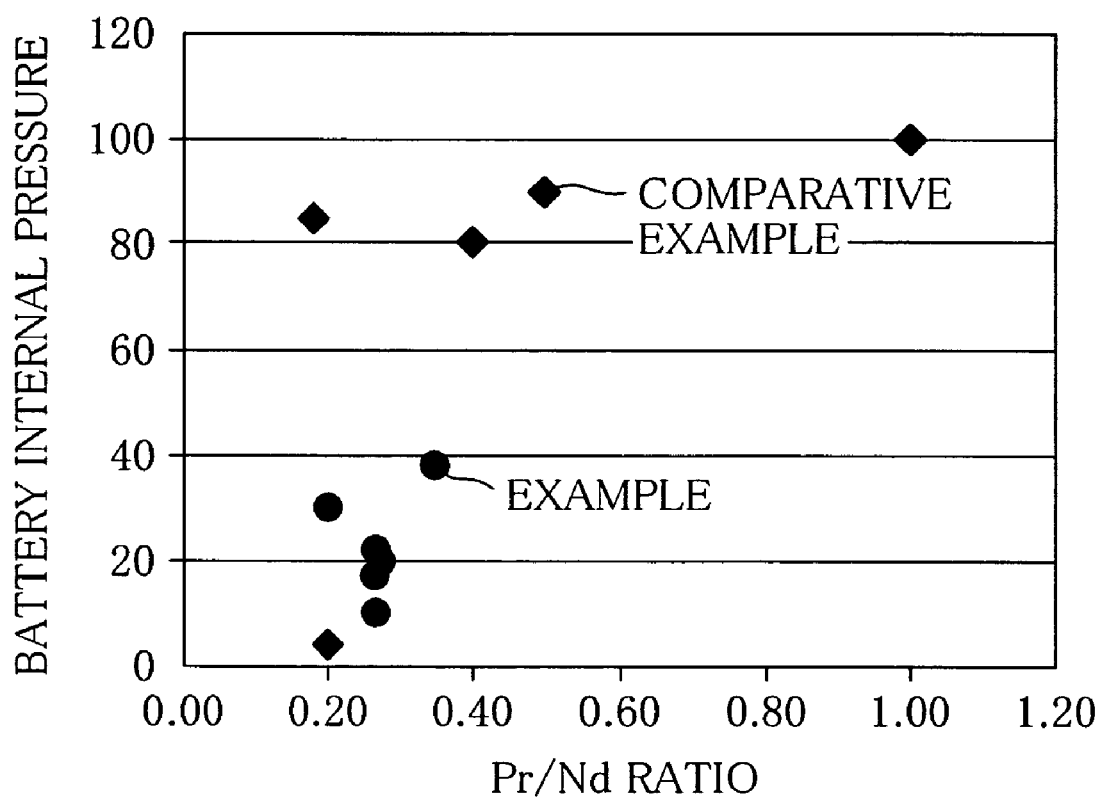
FIG. 2 is a graph showing relationship between Pr/Nd ratio and battery internal pressure when the battery is charged after being overdischarged.

The batteries according to Examples 1 to 7 and Comparative Examples 1 to 5 were left to stand in an atmosphere at a temperature of 80 degrees centigrade for two weeks in a state being connected with a resistive element of 2Ω. Subsequently, each of the batteries was charged with a charging current of 1 ltA for 50 minutes. At the time of this charge, battery internal pressure was measured. Results are shown in TABLE 1 in relative values when a result of Comparative Example 1 is 100, and are also shown in FIG. 2. A horizontal axis of FIG. 2 is Pr/Nd ratio, and a vertical axis is the battery internal pressure. In FIG. 2, circular marks show the results of Examples, and square marks the results of Comparative Examples.

2) Cycle Life

The batteries of Examples 1 to 7 and Comparative Examples 1 to 5 were repeatedly subjected to battery capacity measurement in which they were charged with a current of 0.1 ltA for 16 hours and then discharged with a current of 1.0 ltA until a final voltage of 0.8 V was reached. Cycles were counted until the battery could not be discharged. The results of this measurement are shown in TABLE 1 in relative values when the result of Comparative Example 1 is 100.

TABLE 1 and FIG. 2 show the following matters.
(1) According to Examples 1 to 3 in which the Pr/Nd ratio (b/c) is 0.35 or less, the battery internal pressure during battery charge after overdischarge is drastically reduced as compared to Comparative Examples 1 to 3 in which the Pr/Nd ratio is more than 0.35. This can be considered because the hydrogen equilibrium pressure is reduced in Examples 1 to 3 where the Pr/Nd ratio is 0.35 or less, as compared to Comparative Examples 1 to 3.

(2) According to Examples 1 to 3 in which the Pr/Nd ratio (b/c) is 0.20 or more, the battery internal pressure during battery charge after overdischarge is drastically reduced as compared to Comparative Example 4 in which the Pr/Nd ratio (b/c) is less than 0.20. This can be considered because the gas permeability in the separator is high in Examples 1 to 3 where the Pr/Nd ratio is 0.20 or more as compared to Comparative Example 4.

(3) In Example 4 where the hydrogen storage alloy does not contain La, the battery internal pressure is raised higher than in Example 1. This can be considered because the alkali resistance of the alloy is high due to a smaller amount of La than in Example 1 which decreases the gas permeability of the separator, and the equilibrium pressure is increased due to the reduction of La amount, although the battery internal pressure is also drastically reduced in Example 4 since the Pr/Nd ratio falls in the range of from 0.20 to 0.35 inclusively.

(4) In Example 5 where the hydrogen storage alloy contains Mn, Example 6 where the hydrogen storage alloy contains Zn, and Example 7 where the hydrogen storage alloy contains Mn and Zn, the battery internal pressure is lower than in Example 4. This can be considered because since the hydrogen storage alloy contains either one or both of Mn and Zn, the hydrogen equilibrium pressure is decreased, and the decrease of gas permeability along with the reduction of La amount is compensated.

(5) In Comparative Example 5 where the hydrogen storage alloy contains more La than in Example 2, cycle life is notably short in spite of low battery internal pressure. This can be considered because the alkali resistance of the hydrogen storage alloy is degraded, and the alkaline electrolyte is consumed due to a corrosion reaction since the hydrogen storage alloy contains a large amount of La.

The present invention is not limited to the one embodiment and Examples, and may be modified in various ways. For instance, although the secondary battery of the one embodiment has the shape of a circular cylinder, it is a matter of course that it may have a polygonal shape. Moreover, the

TABLE 1

| | Composition of hydrogen storage alloy | | | | | | Battery Evaluation | |
| --- | --- | --- | --- | --- | --- | --- | --- | --- |
| | La a | Pr b | Nd c | Sm d | Symbol "T" y | Pr/Nd ratio | Battery internal pressure | Cycle life |
| Example 1 | 0.25 | 0.15 | 0.55 | 0.05 | — | 0.27 | 20 | 105 |
| Example 2 | 0.25 | 0.11 | 0.55 | 0.09 | — | 0.20 | 30 | 102 |
| Example 3 | 0.25 | 0.15 | 0.43 | 0.17 | — | 0.35 | 38 | 103 |
| Example 4 | — | 0.20 | 0.75 | 0.05 | — | 0.27 | 22 | 95 |
| Example 5 | — | 0.20 | 0.75 | 0.05 | Mn: 0.1 | 0.27 | 18 | 96 |
| Example 6 | — | 0.20 | 0.75 | 0.05 | Zn: 0.1 | 0.27 | 17 | 101 |
| Example 7 | — | 0.20 | 0.75 | 0.05 | Mn + Zn: 0.2 (Mn: 0.1, Zn: 0.1) | 0.27 | 10 | 99 |
| Comparative Example 1 | 0.25 | 0.35 | 0.35 | 0.05 | — | 1.00 | 100 | 100 |
| Comparative Example 2 | 0.25 | 0.24 | 0.48 | 0.03 | — | 0.50 | 90 | 101 |
| Comparative Example 3 | 0.25 | 0.20 | 0.50 | 0.05 | — | 0.40 | 80 | 103 |
| Comparative Example 4 | 0.25 | 0.10 | 0.55 | 0.10 | — | 0.18 | 85 | 102 |
| Comparative Example 5 | 0.30 | 0.11 | 0.55 | 0.04 | — | 0.20 | 4 | 65 | shape and size of the battery, the mechanism of the safety valve, a method of connecting the electrode plates and the electrode terminals and the like are not limited to the foregoing description, either. The crystal structure of the hydrogen storage alloy may be $AB_{3.8}$-type ($Ce_5 Co_{19}$-type structure), $AB_{3.8}$-type ($Pr_5 Co_{19}$-type structure) or $AB_{3.0}$-type ($PuNi_3$-type structure), instead of $AB_{3.5}$-type ($Ce_2 Ni_7$-type structure).

Needless to say, the hydrogen storage alloy of the present invention is applicable to energy conversion materials or energy storage materials other than rechargeable batteries.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Hydrogen storage alloy comprising:
composition expressed by a general formula:

$$(La_a Pr_b Nd_c Z_d)_{1-w} Mg_w Ni_{z-x-y} Al_x T_y$$

(where Z is at least one element selected from the group consisting of Ce, Pm, Sm, Eu, Gd, Tb, Dy, Ho, Er, Tm, Yb, Lu, Ca, Sr, Sc, Y, Yb, Ti, Zr and Hf and Z includes Sm as an indispensable element, and T is at least one element selected from the group consisting of V, Nb, Ta, Cr, Mo, Mn, Fe, Co, Ga, Zn, Sn, In, Cu, Si, P and B, and subscripts a, b, c and d fall in ranges of $0 \leq a \leq 0.25$, $0 < b$, $0 < c$, and $0.05 \leq d \leq 0.20$, respectively, and satisfy the relationship expressed by $a+b+c+d=1$, where $0.20 \leq b/c \leq 0.35$, and subscripts x, y, z and w fall in ranges of $0.15 \leq x \leq 0.30$, $0 \leq y \leq 0.5$, $3.3 \leq z \leq 3.8$, and $0.05 \leq w \leq 0.15$, respectively).

2. The hydrogen storage alloy according to claim 1, wherein:
in the formula, the subscripts b and c satisfy relationship expressed by $0.20 \leq b/c \leq 0.25$.

3. The hydrogen storage alloy according to claim 2, wherein:
main material of Pr and Nd contained in the hydrogen storage alloy is didymium.

4. The hydrogen storage alloy according to claim 3, wherein:
either one or both of Mn and Zn are contained as element denoted by T.

5. The hydrogen storage alloy according to claim 1, wherein:
main material of Pr and Nd contained in the hydrogen storage alloy is didymium.

6. The hydrogen storage alloy according to claim 5, wherein:
either one or both of Mn and Zn are contained as element denoted by T.

7. The hydrogen storage alloy according to claim 1, wherein:
either one or both of Mn and Zn are contained as element denoted by T.

8. The hydrogen storage alloy according to claim 2, wherein:
either one or both of Mn and Zn are contained as element denoted by T.

9. An alkaline secondary battery comprising:
a negative electrode containing hydrogen storage alloy, wherein the hydrogen storage alloy has composition expressed by a general formula:

$$(La_a Pr_b Nd_c Z_d)_{1-w} Mg_w Ni_{z-x-y} Al_x T_y$$

(where Z is at least one element selected from the group consisting of Ce, Pm, Sm, Eu, Gd, Tb, Dy, Ho, Er, Tm, Yb, Lu, Ca, Sr, Sc, Y, Yb, Ti, Zr and Hf and Z includes Sm as an indispensable element, and T is at least one element selected from the group consisting of V, Nb, Ta, Cr, Mo, Mn, Fe, Co, Ga, Zn, Sn, In, Cu, Si, P and B, and subscripts a, b, c and d fall in ranges of $0 \leq a \leq 0.25$, $0 < b$, $0 < c$, and $0.05 \leq d \leq 0.20$, respectively, and satisfy relationship expressed by $a+b+c+d=1$, where $0.20 \leq b/c \leq 0.35$, and subscripts x, y, z and w fall in ranges of $0.15 \leq x \leq 0.30$, $0 \leq y \leq 0.5$, $3.3 \leq z \leq 3.8$, and $0.05 \leq w \leq 0.15$, respectively).

10. The alkaline secondary battery according to claim 9, wherein:
in the formula, the subscripts b and c satisfy relationship expressed by $0.20 \leq b/c \leq 0.25$.

11. The alkaline secondary battery according to claim 10, wherein:
main material of Pr and Nd contained in the hydrogen storage alloy is didymium.

12. The alkaline secondary battery according to claim 11, wherein:
either one or both of Mn and Zn are contained as element denoted by T.

13. The alkaline secondary battery according to claim 9, wherein:
main material of Pr and Nd contained in the hydrogen storage alloy is didymium.

14. The alkaline secondary battery according to claim 13, wherein:
either one or both of Mn and Zn are contained as element denoted by T.

15. The alkaline secondary battery according to claim 9, wherein:
either one or both of Mn and Zn are contained as element denoted by T.

16. The alkaline secondary battery according to claim 10, wherein:
either one or both of Mn and Zn are contained as element denoted by T.

* * * * *